July 28, 1964

D. W. SCHMERLING 3,142,746

CONSUMABLE ELECTRODE ARC WELDING APPARATUS

Filed July 28, 1961

INVENTOR.
Donald W. Schmerling
BY
Andrus & Starke
Attorneys

United States Patent Office 3,142,746
Patented July 28, 1964

3,142,746
CONSUMABLE ELECTRODE ARC WELDING
APPARATUS
Donald W. Schmerling, Fontana, Wis., assignor to A. O. Smith Corporation, Milwaukee, Wis., a corporation of New York
Filed July 28, 1961, Ser. No. 127,687
3 Claims. (Cl. 219—130)

This invention relates to consumable electrode arc welding apparatus and particularly to a contact tube unit having pressure means establishing a positive contact point between the electrode and the contact tube.

In consumable electrode arc welding apparatus, an electrode of indefinite length is fed through a welding nozzle to an arc which is struck between the tip of the electrode and a workpiece. Generally, the electrode is fed through a contact tube within the welding nozzle. The current is applied to the electrode through the contact tube which also directs the electrode into the desired position with respect to the work. For example, the United States Patent 2,903,567 to Piekarski et al. discloses a particularly suitable manual actuated welding gun for directing a consumable electrode to a welding arc. As shown in the reference, a simple, inexpensive copper tube or the like is held within the nozzle end of the welding gun to feed the electrode to an arc. The flexing of the electrode within the contact tube is generally relied upon to establish current transfer from the contact tube to the electrode.

Although the above arrangement gives a completely satisfactory operating welding apparatus, for optimum results it is preferable that the current be applied at a selected point along the contact tube and preferably near the discharge end of the contact tube. Many patents disclose the use of special contact tube tips with insulating liner in back of the tip to restrict the application of current to the electrode adjacent the terminal end of the portion of the welding gun. Normally, the special tips are formed with very close tolerances such that the current is transferred to the electrode throughout the complete length of the electrode or the contact tube.

The present invention is directed to a very simple and inexpensive contact unit having a pressurized contact point to insure transfer of current to the electrode at a selected point with respect to the discharge end or the tip of the electrode. In this manner, the distance between the current input to the electrode and the work is maintained essentially constant.

In accordance with the present invention, the contact tube includes a movable resiliently mounted member which is urged into the contact tube passage for the electrode. The electrode is passed between the wall of the contact tube and the member which maintains a sliding and clamping pressure forcing the electrode into positive engagement with the opposed wall of the contact tube. Consequently, a relatively low resistance conductive path is established at the point of the pressure member and the current transfer is essentially maintained at the selected point in the contact tube.

The resiliently mounted member is preferably a spherical ball. A split ring encircles the contact tube and urges the ball into the contact tube passage for the electrode. The spherical ball establishes minimal friction with the electrode and thus provides a smooth continuous feed.

The present invention provides a very inexpensive means for establishing a positive selected current transfer location. The electrode contact tube can therefore be formed from ordinary extruded copper tubing or the like without the necessity for maintaining close manufacturing tolerances of the internal diameter of the contact tube. Further, the present invention does not rely on the flexing of the electrode within the contact tube to effect the current transfer. Consequently, the contact tube can be substantially shortened to further reduce the expense of the contact tube.

The drawings furnished herewith illustrate the best mode presently contemplated for carrying out the invention.

Figure 1:
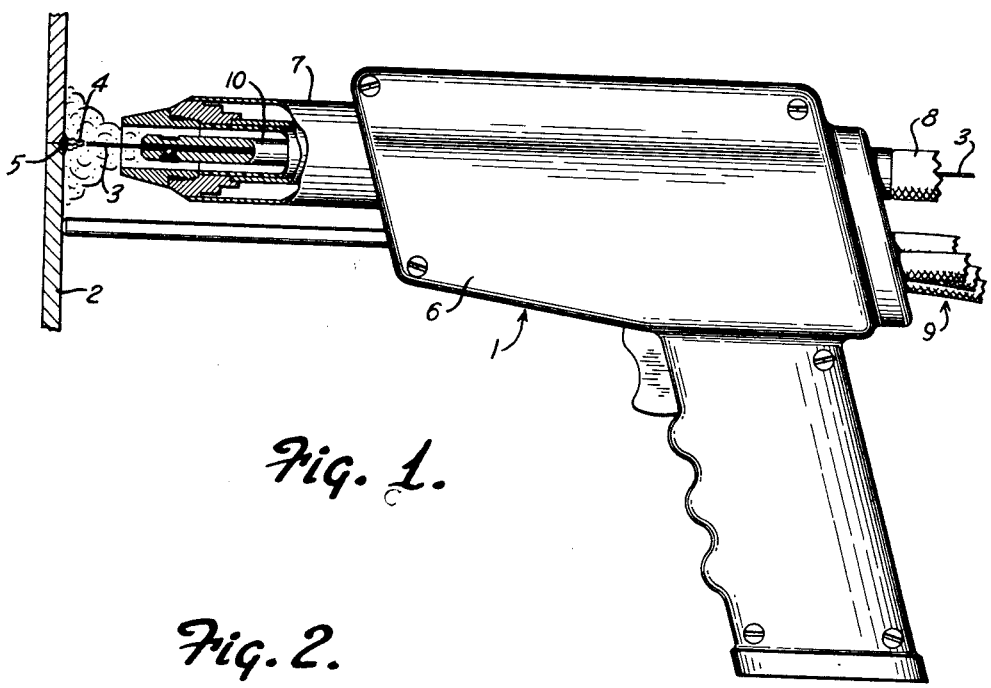
FIG. 1 is a side elevational view of a manual welding gun with parts broken away to more clearly illustrate the present invention.

Referring to the drawings and particularly to FIG. 1, the manually operated or manipulated welding gun 1 is shown located with respect to a work member 2. An electrode 3 is fed through the welding gun 1 toward the work 2 to establish and maintain an arc 4 between the tip of the electrode 3 and the work 2 and to establish the weld 5.

Generally, the illustrated arc welding gun is similar to that shown and claimed in the previously referred to United States Patent 2,903,567 to Piekarski. The illustrated gun 1 includes an insulating housing and handle 6 having a nozzle assembly 7 secured within the forward end of the housing 6. An incoming electrode guide 8 is secured to the back side of the housing 6 for guiding the electrode 3 from a remote source, not shown, into the welding gun which includes a suitable passage for directing the electrode 3 through the gun 1. The illustrated gun 1 is particularly adapted for gas shielded arc welding and suitable gas and water conduits 9 are inserted through the back side of the welding gun. A contact tube 10, formed of copper or other suitable highly conductive material, is secured within the nozzle 7 in any suitable manner, not shown, and forms the terminal portion of the electrode guide passage through the gun 1. The contact tube 10 is connected to a suitable power source and current is transferred to the electrode 3 from the electrode contact tube 10.

Figure 2:
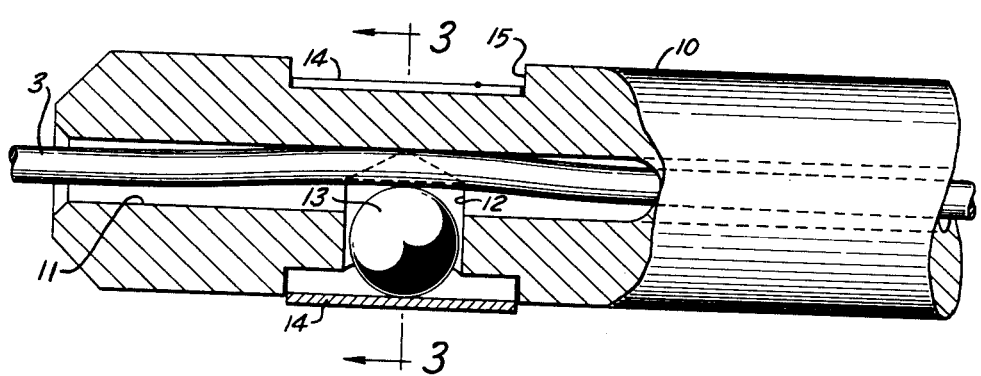
FIG. 2 is an enlarged fragmentary view of a portion of the welding gun shown in FIG. 1 clearly illustrating a contact tube constructed in accordance with the present invention.
Figure 3:
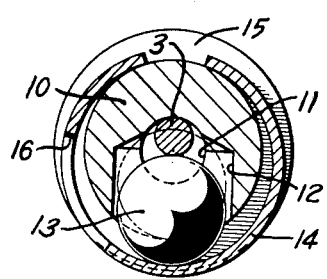
FIG. 3 is a cross sectional view taken on lines 3—3 of FIG. 2.

Referring particularly to FIGS. 2 and 3, the contact tube 10, which is constructed in accordance with the present invention, includes a central longitudinal passageway 11 for the electrode 3. Passageway 11 is shown substantially enlarged for clarity of illustration. A radial opening 12 is formed in the wall of the tube 10 immediately adjacent the arc end thereof. A clamping ball 13 is slidably disposed within the radial opening 12. The diameter of the opening 12 and the pressure transmitting ball 13 are substantially larger than the axial passageway accommodating the electrode 3.

In the illustrated embodiment of the invention, the ball 13 in the innermost position, as shown in phantom in FIG. 3, substantially closes the electrode passageway 11 with the outer surface or periphery of the ball generally aligned with the outer edge of the radial opening 12.

A tubular split clip 14 of stainless steel or other suitable resilient material encircles the contact tube 10 overlying the radial opening 12 to hold the clamping ball 13 within the radial opening 12 and biased to the innermost position closing the axial passageway 11. An annular recess 15 is formed in the outer surface of the contact tube 13 to accommodate and prevent axial movement of the tubular spring clip 14. The clip 14 is longer than the diameter of ball 13 and includes an opening 16 in one side thereof for inserting and removing the ball by aligning opening 16 with opening 12.

During a welding operation, the cooling water and gas shielding is simultaneously supplied to the gun to establish the cooling of the nozzle 7 and the gas shield about the arc 4. The electrode 3 is continuously fed through the welding gun 1 and power is supplied to the contact tube 13.

In the illustrated embodiment of the invention, the electrode 3 forces the transmitting ball 16 outwardly through the radial opening 15 in accordance with the diameter of the electrode 3. The tubular clip 14 expands or opens as shown in FIGS. 2 and 3 to maintain a radial pressure biasing the clamping ball 13 into firm sliding engagement with the electrode 3. Consequently, the electrode 3 is positively forced into sliding engagement with the contact tube 10 opposite from the radial opening 12. This establishes a relatively low resistance path between the contact tube 10 and the electrode 3 at that point and essentially complete current transfer to the electrode 3 is made at that point under all welding conditions. Consequently, the impressed current is in a constant electrode length and results in a very stable and optimum arc welding characteristic.

The contact tube 10 may be relatively short because of the positive establishment of a current transfer point. In the absence of applicant's invention, a relatively short contact tube must have an internal diameter generally corresponding quite closely to the diameter of the electrode to insure transfer of current without arcing. Where the internal diameter is not formed with a close tolerance, a relatively long contact tube has normally been employed to obtain a low resistance current transfer point and prevent arcing.

The present invention can be readily adapted to arc welding guns of conventional construction employing the extruded copper contact tube and the like.

The present invention provides a relatively simple and inexpensive means for establishing selected and closely regulated current transfer to a consumable welding electrode resulting in optimum arc characteristic and sound welds.

Various modes of carrying out the invention are contemplated as being within the scope of the following claims particularly pointing out and distinctly claiming the subject matter which is regarded as the invention.

I claim:

1. A consumable electrode contact unit, comprising a tubular contact tube having an axial opening generally corresponding to the diameter of the electrode and a radial opening adjacent the discharge end of the contact tube, a pressure transmitting member in said radial opening having an inner spherically shaped face and substantially closing the axial passage in the innermost position, and a tubular split spring clip encircling the contact tube and overlying the radial opening to continuously resiliently urge the member into the contact tube with the spherically shaped face engaging the electrode and firmly holding the electrode in engagement with the opposite aligned interior surface of the contact tube.

2. A consumable electrode contact unit, comprising a tubular contact tube having an axial opening generally corresponding to the diameter of the electrode and a radial opening adjacent the discharge end of the contact tube, a ball slidably disposed in said radial opening and substantially closing the axial passage in the innermost position, and a tubular split spring clip encircling the contact tube and overlying the radial opening to continuously resiliently urge the ball into the contact tube, said contact tube having an outer encircling recess accommodating said spring clip and preventing axial movement thereof.

3. The construction of claim 2 wherein the tubular spring clip includes an opening for insertion and removal of the ball in the radial opening.

References Cited in the file of this patent

UNITED STATES PATENTS

| | | |
|---|---|---|
| 2,289,938 | Smith | July 14, 1942 |
| 2,379,470 | Baird | July 3, 1945 |
| 2,402,256 | Nelson | June 18, 1946 |
| 2,981,825 | Rundell | Apr. 25, 1961 |
| 3,007,032 | Whiteman | Oct. 31, 1961 |
| 3,038,059 | Hinricks | June 5, 1962 |